United States Patent
Meguro

(10) Patent No.: US 6,437,942 B1
(45) Date of Patent: Aug. 20, 2002

(54) DISC CARTRIDGE WITH IMPROVED SHUTTER SLIDE OPERATION

(75) Inventor: Hiroshi Meguro, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/352,754

(22) Filed: Jul. 14, 1999

(30) Foreign Application Priority Data

Jul. 24, 1998 (JP) .......................................... 10-209537

(51) Int. Cl.⁷ .............................................. G11B 23/03
(52) U.S. Cl. ..................................................... 360/133
(58) Field of Search ........................... 360/133; 369/291

(56) References Cited

FOREIGN PATENT DOCUMENTS

| EP | 0 653 755 A2 | 5/1995 |
|---|---|---|
| JP | 59-072687 | 4/1984 |
| JP | 03-194783 | 8/1991 |
| JP | 05-120827 | 5/1993 |

*Primary Examiner*—George J. Letscher
(74) *Attorney, Agent, or Firm*—Bell, Boyd & Lloyd LLC

(57) ABSTRACT

In a disc cartridge, a shutter slidably attached on a shell can be prevented from being projected from a front end surface of the shell by means of a spring force exerted by a spring. The shutter (5) includes first and second shutter plate portions (5a and 5b) overlapped on upper and lower surfaces (3a and 3b) of the shell (3) and a linkage plate portion (5c) overlapped on the front end surface (3c) of the shell (3). First and second slide guide projections (39 and 40) are installed on the second shutter plate portion (5b) and are inserted into first and second slide guide grooves (37 and 38) formed along the front end surface (3c) of the shell (3). A difference in distance ($L_5$) ($L_5 = L_3 - L_1$) between a distance ($L_3$) from an inner surface of the first slide guide projection (39) to an outer surface of the linkage plate portion (5c) of the shutter (5) and a distance $L_1$ from the first slide guide projection (39) to the front end surface (3c) of the shell (3) is set to be smaller than the difference in distance ($L_6$) ($L_6 = L_4 - L_2$) between a distance ($L_6$) from an inner surface of the second slide guide projection (40) to the outer surface of the linkage plate portion (5c) of the shutter (5) and a distance ($L_2$) from the side surface (38a) of the second slide guide groove (38) to the front end surface (3c) of the shell (3).

4 Claims, 11 Drawing Sheets

DISC CARTRIDGE WITH IMPROVED SHUTTER SLIDE OPERATION

BACKGROUND OF THE INVENTION:

a) Field of the invention

The present invention relates to a disc cartridge in which a shutter is arranged to open or close a record playback opening of a shell rotatably housing a disc-shaped recording medium and in which a spring force exerted by a shutter biasing spring biasing the shutter in a close direction can prevent the shutter from being projected from a front end surface of the shell.

b) Description of the related art

FIGS. 9 through 14 show a previously proposed disc cartridge, for example, a floppy disc cartridge.

The disc cartridge 101 includes: a disc-shaped recording medium 102; a shell 103 rotatably housing the disc-shaped recording medium; a shutter 105 opening and closing a record playback opening 104 installed on upper and lower surfaces 103a and 103b of the shell 103; and a spring 106 used for a biasing purpose of the shutter (a twisted coil spring) to bias the shutter 105 toward the opening 104 for the record playback purpose.

The shell 103 is provided with an upper surface 103a, a lower surface 103b, a front end surface 103c, and a recess 103d for attaching the shutter, the recess 103d constituting a shutter slide area. The above-described recess 103d is formed with the approximately same depth D as the thickness T of the shutter 105.

The shutter 105 includes: first and second shutter plate portions 105a and 105b overlapped on the shutter attaching recess 103d of the upper and lower surfaces of the shell 103; and a linkage plate portion 105c linked to each one end of the first and second shutter plate portions 105a and 105b and having an inner surface overlapped on the shutter attaching recess 103d of the front end surface 103c of the shell 103. In addition, the second shutter plate portion 105b is provided with front and second slide guide projections 107 and 108 disposed on one end and the other end of the plate portion 105b in its shutter slide direction.

The above-described shutter 105 is attached on the shell 103 so that the first and second slide guide projections 107 and 108 are inserted into first and second slide guide grooves 109 and 110 and are slid along these slide guide grooves 109 and 110.

The first and second slide guide grooves 109 and 110 are disposed on the upper surface 103b of the shell 103 in parallel to each other along the front end surface 103c of the shell 103.

The shutter biasing spring 106 has one end 106a engaged to a spring engagement portion 111 installed on a side portion of the shutter 105 on which the first slide guide projection 107 is attached and has the other end 106b engaged to an inner wall of the shell 103.

As typically shown in FIG. 11, a distance $L_{11}$ from an inner surface (a surface opposed against a linkage plate portion 105c) of the first slide guide projection 107 to an outer surface of the linkage plate portion 105c of the shutter 105 and a distance $L_{12}$ from an inner surface (the surface opposed against the linkage plate portion 105c) of the second slide guide projection 108 to the outer surface of the linkage plate portion 105c of the shutter 105 are formed to be equal to each other ($L3_{11}=L_{12}$). In other words, both of the first slide guide projection 107 and the second slide guide projection 108 are arranged on the same straight line position in parallel to the linkage plate portion 105c of the shutter 105.

In addition, a distance $L_{13}$ from the first slide guide groove 109 into which the first slide guide projection 107 is inserted to the front end surface 103c of the shell 103 and a distance $L_{14}$ from the second slide guide groove 110 into which the second slide guide projection 108 is inserted to the front end surface 103c of the shell 103 are formed to be equal to each other ($L_{13}=L_{14}$).

In other words, the first slide guide groove 109 and the second slide guide groove 110 are arranged on the same straight line position in parallel to the front end surface 103c of the shell 103.

The shutter 105 is slidably attached on a shutter attaching recess 103d of the shutter 103 by inserting the shell 103 between the first and second shutter plate portions 105a and 105b from the front end surface 103c of the shell 103 and by inserting the first and second slide guide projections 107 and 108 into the first and second slide guide grooves 109 and 110, respectively.

SUMMARY OF THE INVENTION

However, in the disc cartridge 101 described in the BACKGROUND OF THE INVENTION, the spring force exerted by the shutter biasing spring 106 causes the one end of the shutter 105 to which the spring 106 is engaged to be projected from the front end surface 103c of the shell 103. Hence, the shell 103 becomes easy to be interfered against other parts. Dust becomes easy to be invaded into the shell 103. Or, a clearance δ is developed between the side portion of the shutter plate portions 105a and 105b and the side portion 103e of the shutter attaching recess 103d of the shell 103. This clearance gives a user, to his eye, a kind of unstable sense of feeling and gives worse outer appearance.

Causes of the projection of the one end of the linkage plate portion 105c of the shutter 105 from the front end surface 103c of the shutter 103 was pursued.

As the result of this pursuit, one cause was determined.

That is to say, the cause was that the distance $L_{11}$ from the first slide guide projection 107 to the outer surface of the linkage plate portion 105c of the shutter 105 and the distance $L_{12}$ from the second slide guide projection 108 to the outer surface of the linkage plate portion 105c of the shutter 105 were formed to be mutually w the same value ($L_{11}=L_{12}$). In details, the cause was that the first slide guide projection 107 and the second slide guide projection 108 were arranged on the same straight line position in parallel to the linkage plate portion 105c of the shutter 105. In addition, the cause was that a distance $L_{13}$ from the first slide guide groove 109 into which the first slide guide projection 107 was inserted to the front end surface 103c of the shell 103 and a distance $L_{14}$ from the second slide guide groove 110 into which the second slide guide projection 108 was inserted to the front end surface 103c of the shell 103 were formed to be mutually the same value ($L_{13}=L_{14}$). In details, the first slide guide groove 109 and the second slide guide groove 110 were arranged on the same straight line position in parallel to the front end surface 103c of the shell 103.

As shown in FIG. 12, a (play) clearance (hereinafter, referred to as a play clearance) $δ_1$ is provided between the first slide guide projection 107 and the first slide guide groove 109 and another play clearance $δ_2$ is provided between the second slide guide projection 108 and the second slide guide groove 110 in order for the first and second slide guide projections 107 and 108 to be inserted into the first and second slide guide grooves 109 and 110 and to be slid smoothly thereon.

The play clearances $δ_1$ and $δ_2$ have mutually the same value. Hence, the shutter biasing spring 106 causes the shutter 105 to be pressed against the side portion 103e of the shutter attaching recess 103d of the shell 103 causes the shutter 105 to generate a resultant force to project the shutter 105. At this time, one end of the linkage plate portion 105c of the shutter 105 is projected from the front end surface 103c of the shell 103 by a distance quantity which is approximately the same as the play clearance $\delta_1$.

To suppress the projection, magnitudes of the play clearances $\delta_1$ and $\delta_2$ may be reduced.

However, the reduction of the play clearances $\delta_1$ and $\delta_2$, in turn, worsens a slide guide ability of the shutter 105.

It is, therefore, an object of the present invention to provide the disc cartridge in which the play clearance ($\delta_1$) between the first slide guide projection (107) and the first slide groove (109) is set to be smaller than the other play clearance ($\delta_2$) between the second slide guide groove (110) so that the projection of the linkage plate portion (105c) of the shutter (105) from the front end surface 103c of the shell (103) can be suppressed without worsening of the slide guide ability of the shutter (105).

According to one aspect of the present invention, there is provided with a disc cartridge comprising: a disc-shaped recording medium; a shell rotatably housing the disc-shaped recording medium; a shutter, the shutter being slidably attached onto the shell and opening and closing a record playback opening provided on upper and lower surfaces of the shell; first and second shutter plate portions, the first and second shutter plate portions constituting the shutter and being overlapped on the upper and lower surfaces of the shell, respectively; a linkage plate portion, the linkage plate portion constituting the shutter, being linked to each one end of the first and second shutter portions, and having an inner surface overlapped on a front end surface of the shell; first and second slide guide projections, the first and second slide guide projections being attached on one end and the other end of the first and second shutter plate portions in a shutter slide direction, respectively; first and second slide guide grooves, the first and second slide guide groove onto which the first and second slide guide projections are inserted to enable the shutter to slide therealong being disposed along the front end surface of the shell; and a spring, the spring biasing the shutter in a direction to close the record playback opening, having one end engaged to a side portion of the shutter onto which the first slide guide projection is installed, and having the other end being engaged to the shell, and wherein a difference in distance between a first distance from the first slide guide projection to an outer surface of the linkage plate portion of the shutter and a second distance from the first slide guide groove into which the first slide guide projection is inserted to the front end surface of the shell is set to be smaller than that between a third distance from the second slide guide groove into which the second slide guide projection is inserted to the front end surface of the shell and a fourth distance from the outer surface of the linkage plate portion of the shutter to the inner surface of the second slide guide projection.

Hence, a play clearance provided between the first slide guide projection and the inner surface of the first slide guide groove opposed against the front end surface of the shell is smaller than another play clearance provided between the second slide guide projection and the inner side surface of the second slide guide groove opposed against the front end surface of the shell. Consequently, a projection of the linkage plate portion of the shutter from the front end surface of the shell can be suppressed.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 1:
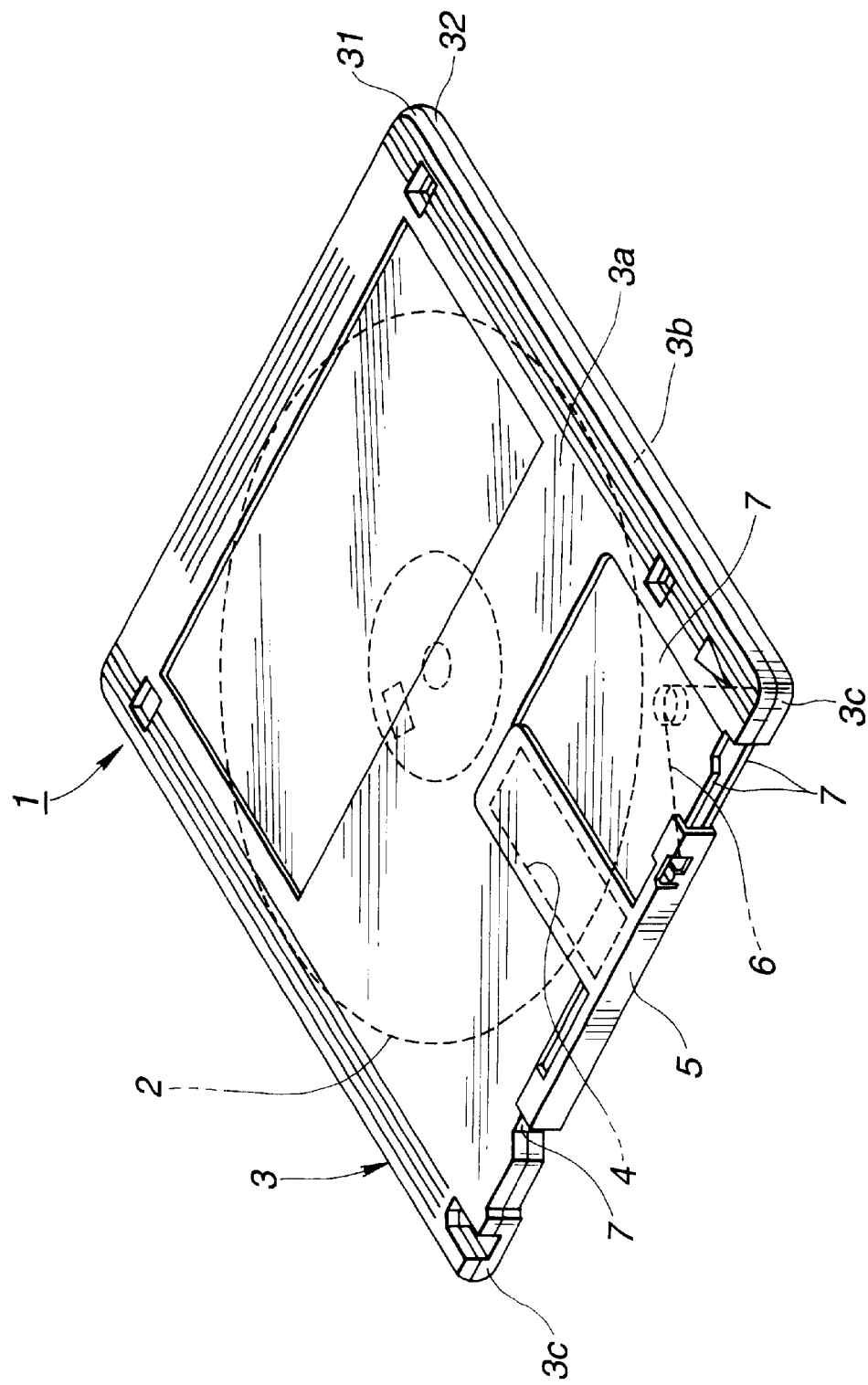
FIG. 1 is a perspective view of a disc cartridge in a preferred embodiment according to the present invention as viewed from its upper surface direction.

FIG. 1 shows a perspective view of a disc cartridge 1 in a preferred embodiment as viewed from its upper surface direction.

Figure 2:
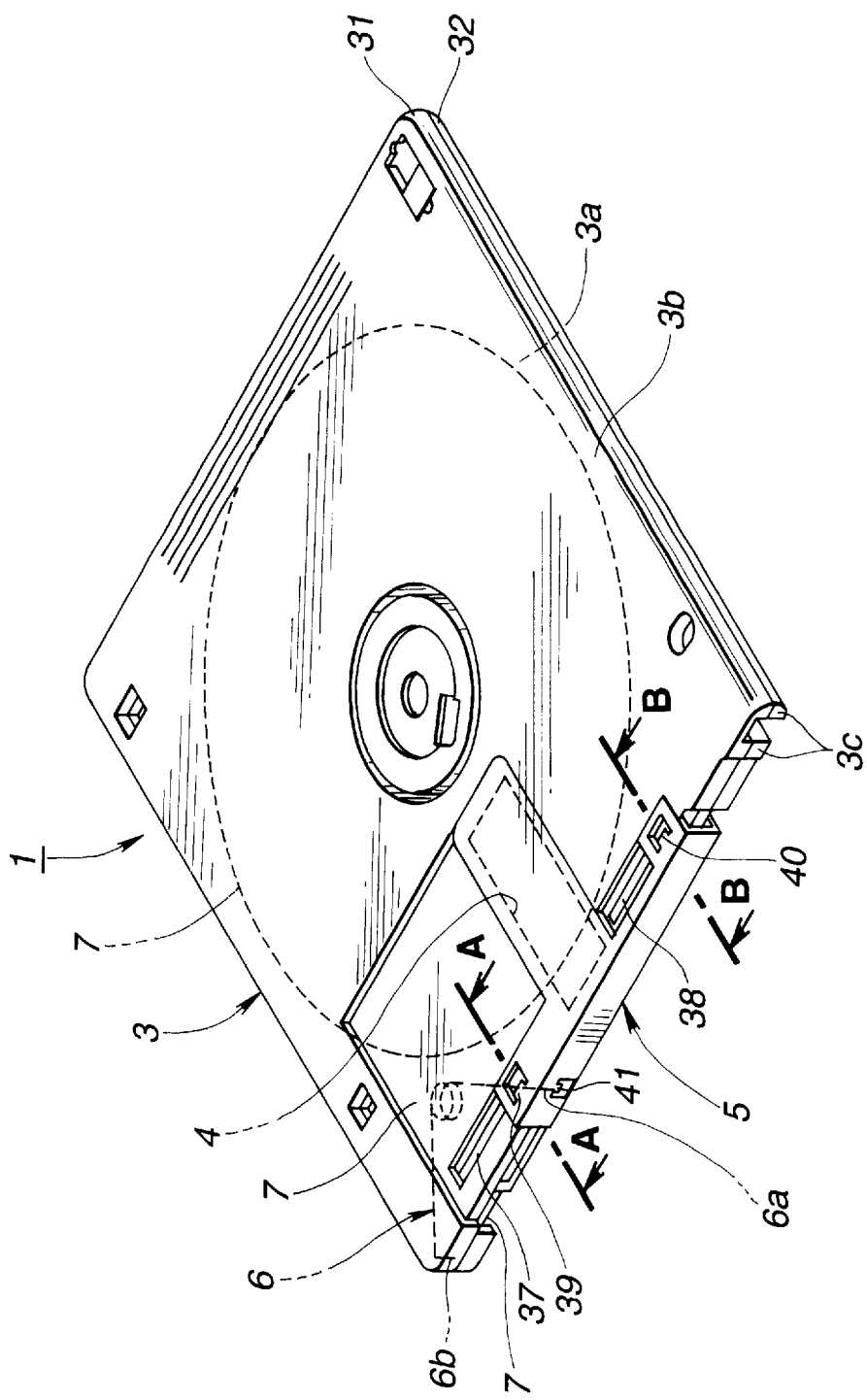
FIG. 2 is another perspective view of the disc cartridge in the preferred embodiment as viewed from its lower surface in the preferred embodiment.

FIG. 2 shows a perspective view of the disc cartridge 1 in the preferred embodiment as viewed from its lower surface direction.

Figure 3:
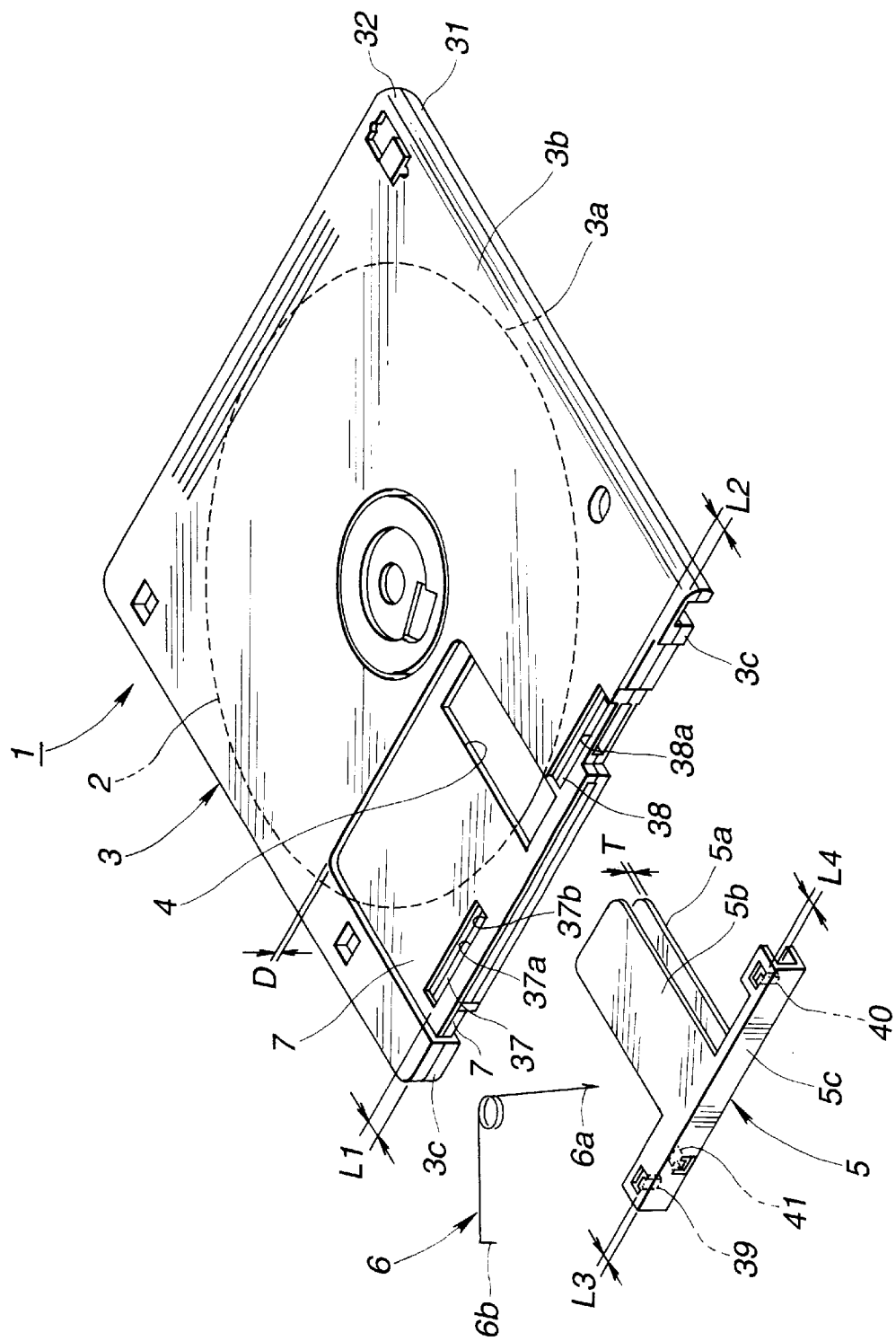
FIG. 3 is a still another perspective view of the disc cartridge in the preferred embodiment with its shutter removed.

FIG. 3 shows a plan view of an essential part of the disc cartridge 1 in the preferred embodiment with its shutter removed.

Figure 4:
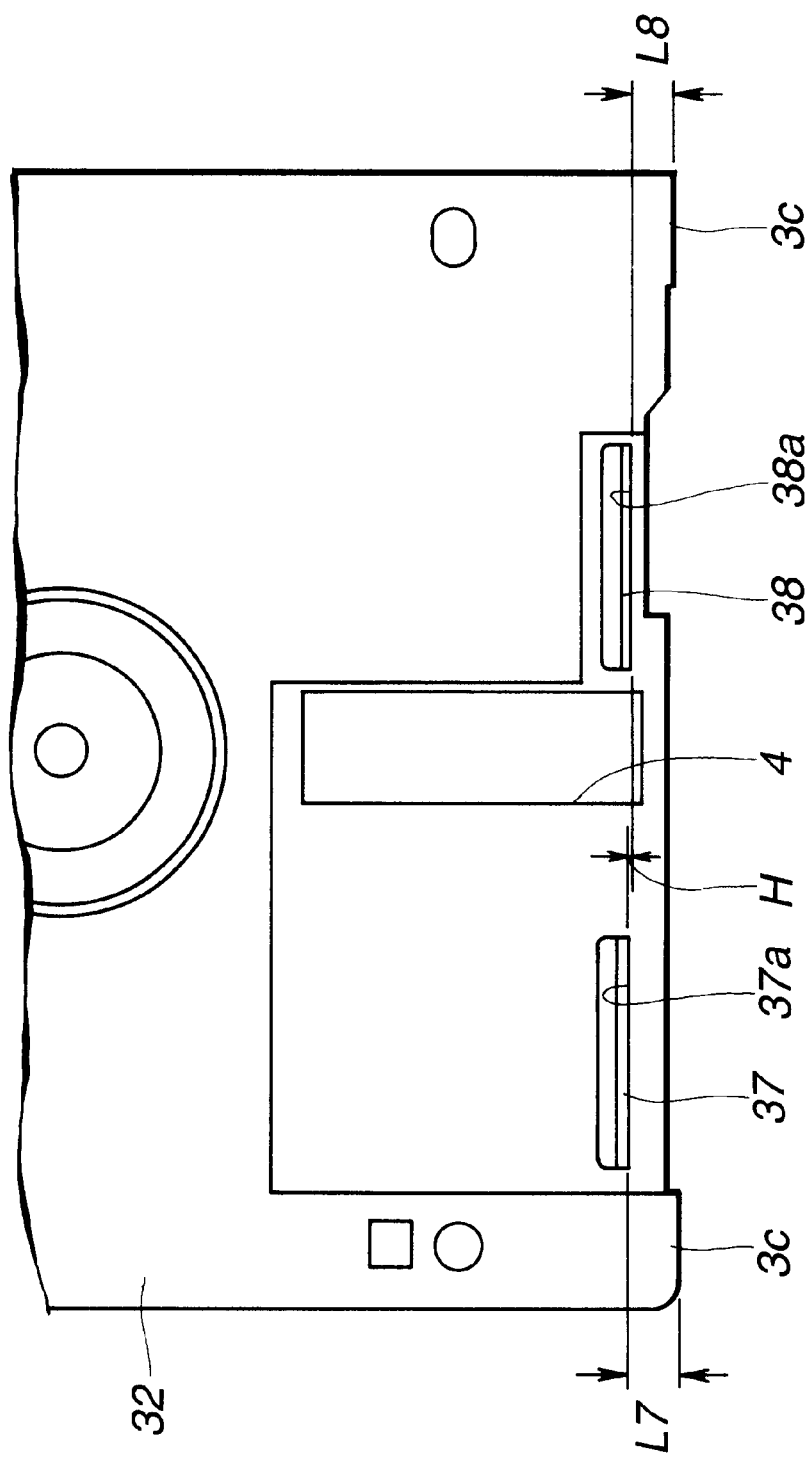
FIG. 4 is a plan view of an essential part of the disc cartridge in the preferred embodiment as viewed from its lower surface.

FIG. 4 shows a plan view of an essential part of the disc cartridge 1 as viewed from its lower surface direction.

Figure 5:
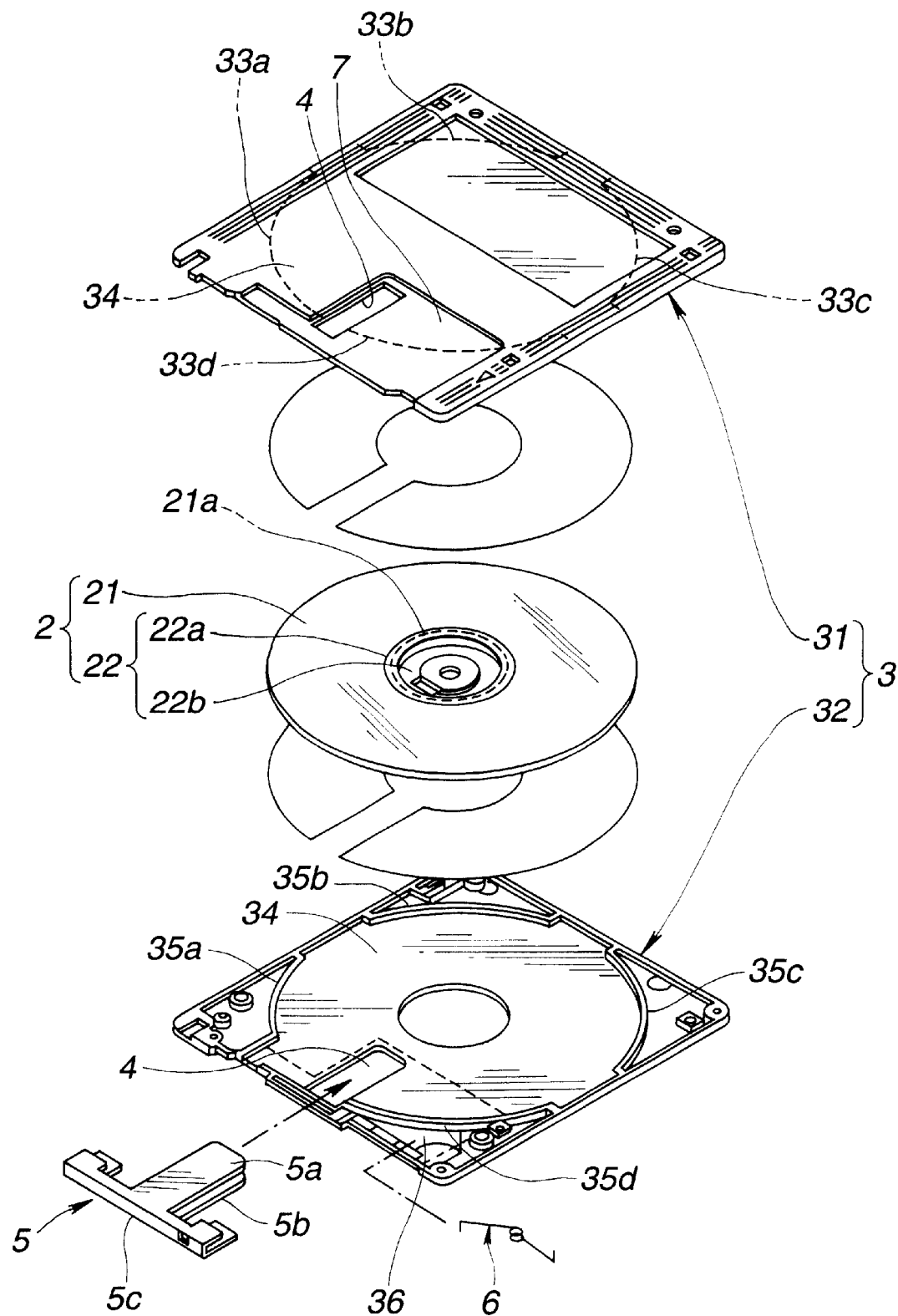
FIG. 5 is an exploded perspective view of the disc cartridge in the preferred embodiment.

FIG. 5 shows an exploded perspective view of the disc cartridge.

Figure 6:
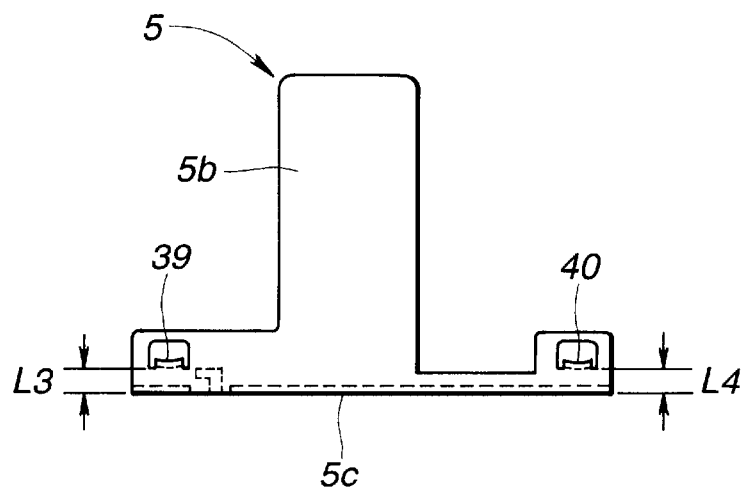
FIG. 6 is a plan view of the shutter in the disc cartridge in the preferred embodiment.

FIG. 6 shows a plan view of the shutter in the disc cartridge.

Figure 7:
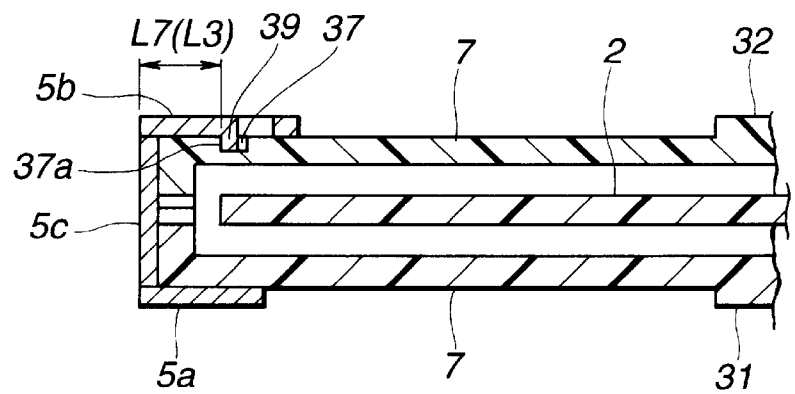
FIG. 7 is a cross sectional view of the disc cartridge in the preferred embodiment cut away along a line A—A in FIG. 2.

FIG. 7 shows a cross section view of the disc cartridge in the preferred embodiment cut away along a line A—A in FIG. 2.

Figure 8:
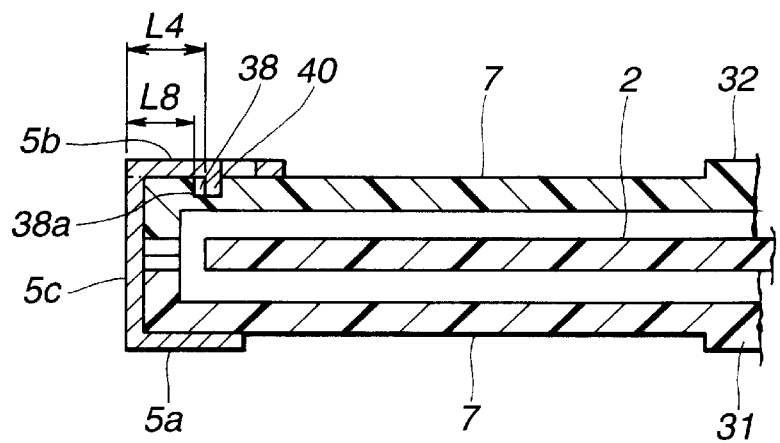
FIG. 8 is a cross sectional view of the disc cartridge in the preferred embodiment cut away along a line B—B in FIG. 2.
Figure 9:
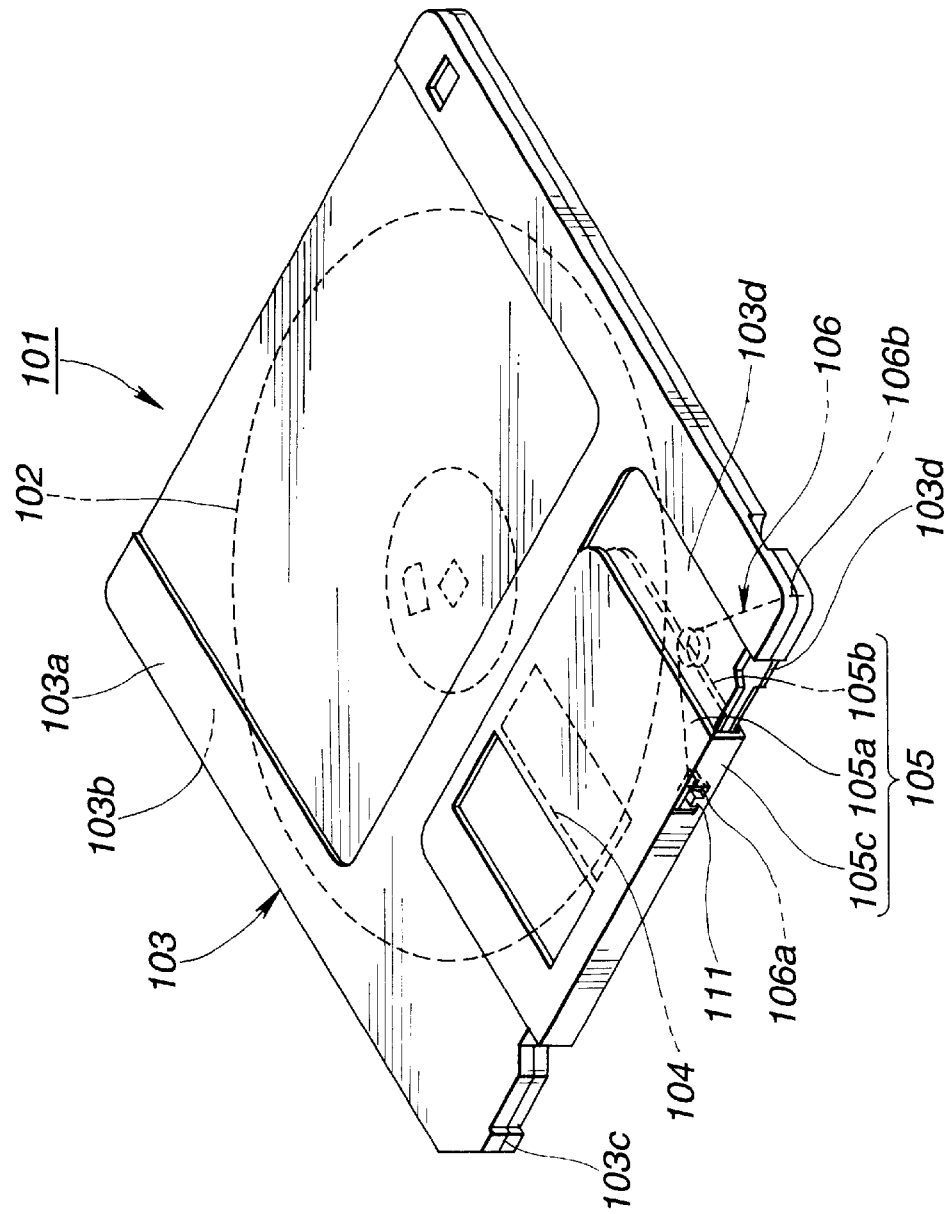
FIG. 9 is a perspective view of a previously proposed cartridge described in the BACKGROUND OF THE INVENTION as viewed from its upper surface direction.
Figure 10:
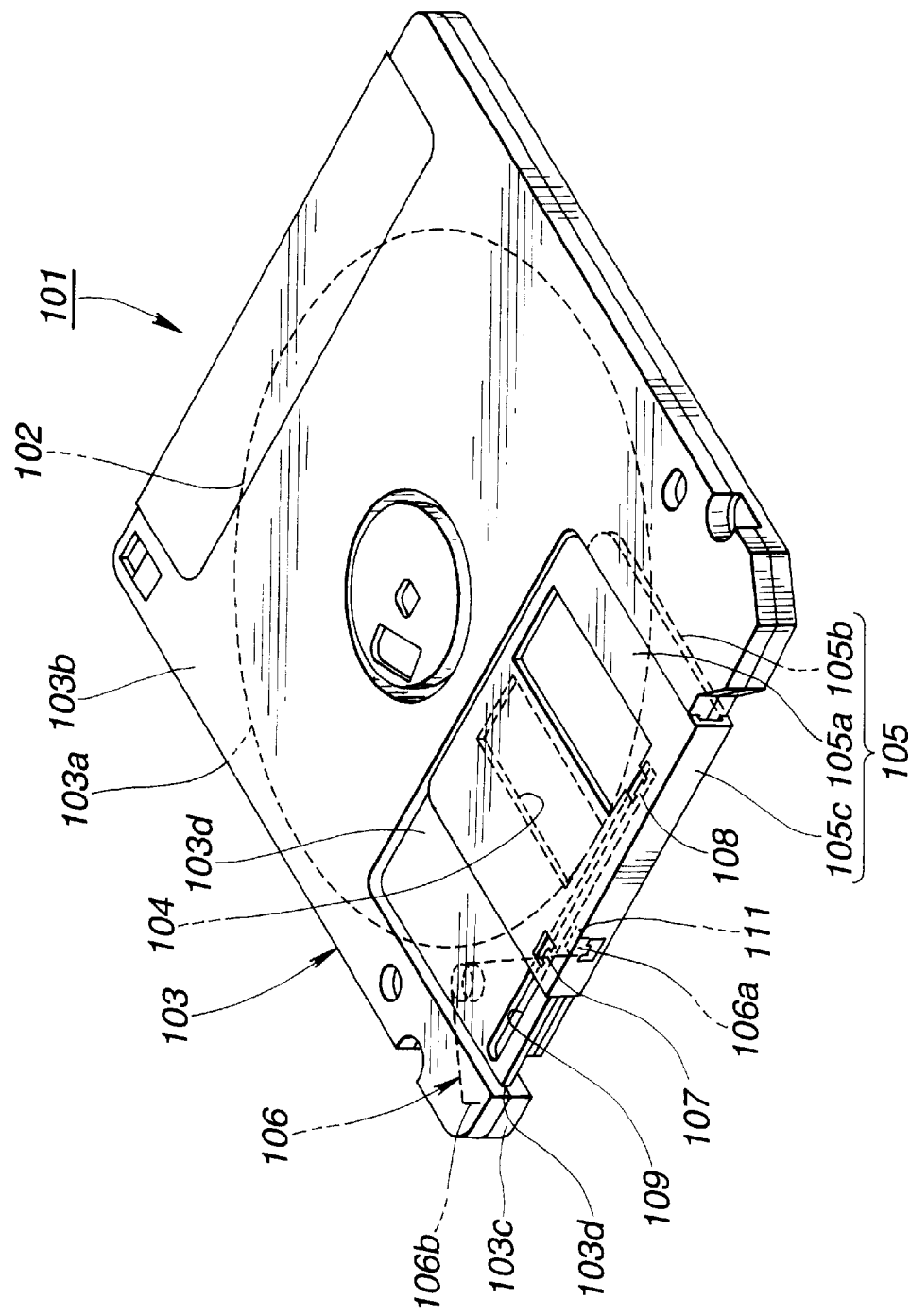
FIG. 10 is another perspective view of the previously proposed disc cartridge described in the BACKGROUND OF THE INVENTION as viewed from its lower surface.
Figure 11:
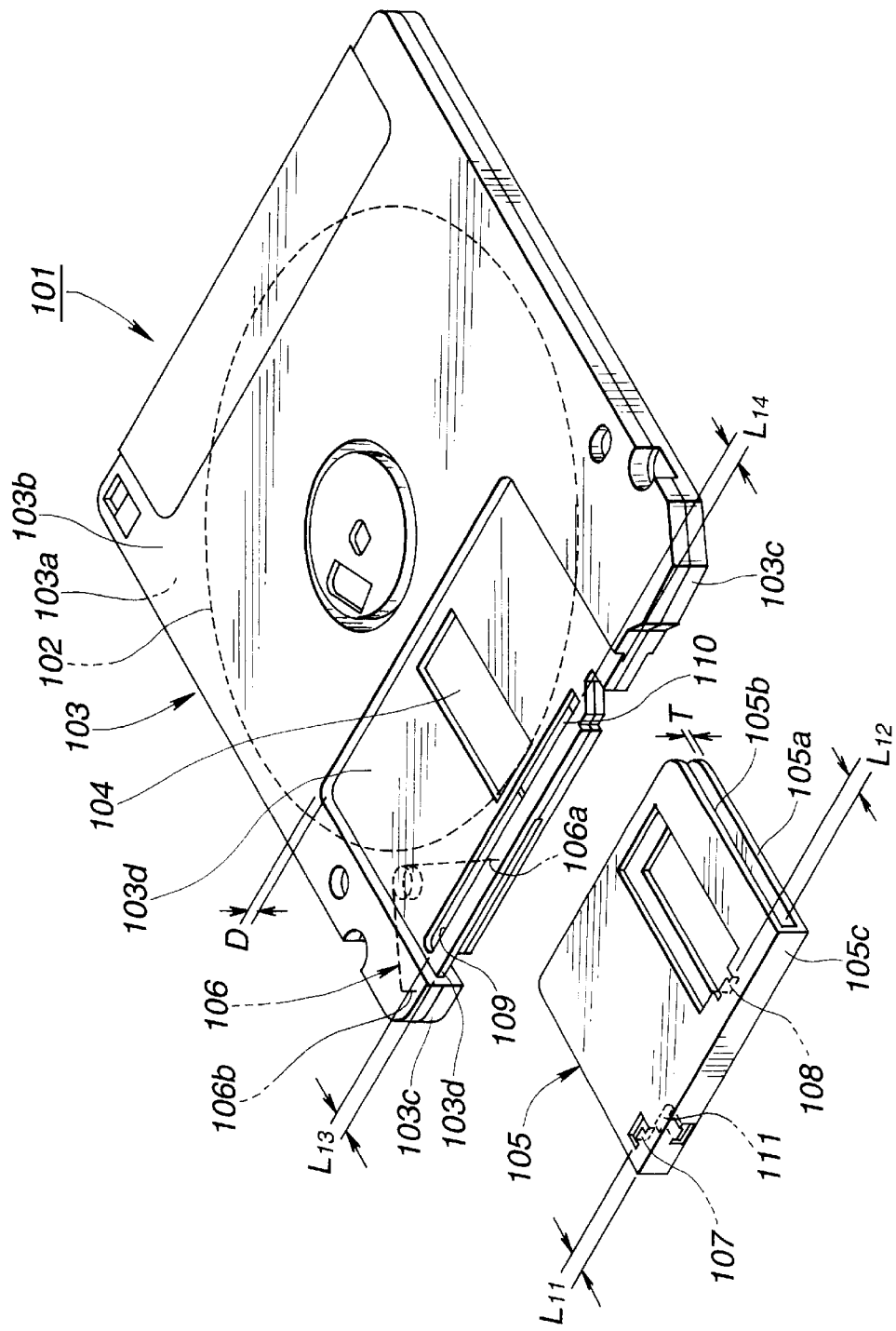
FIG. 11 is a perspective view of the previously proposed disc cartridge described in the BACKGROUND OF THE INVENTION.
Figure 12:
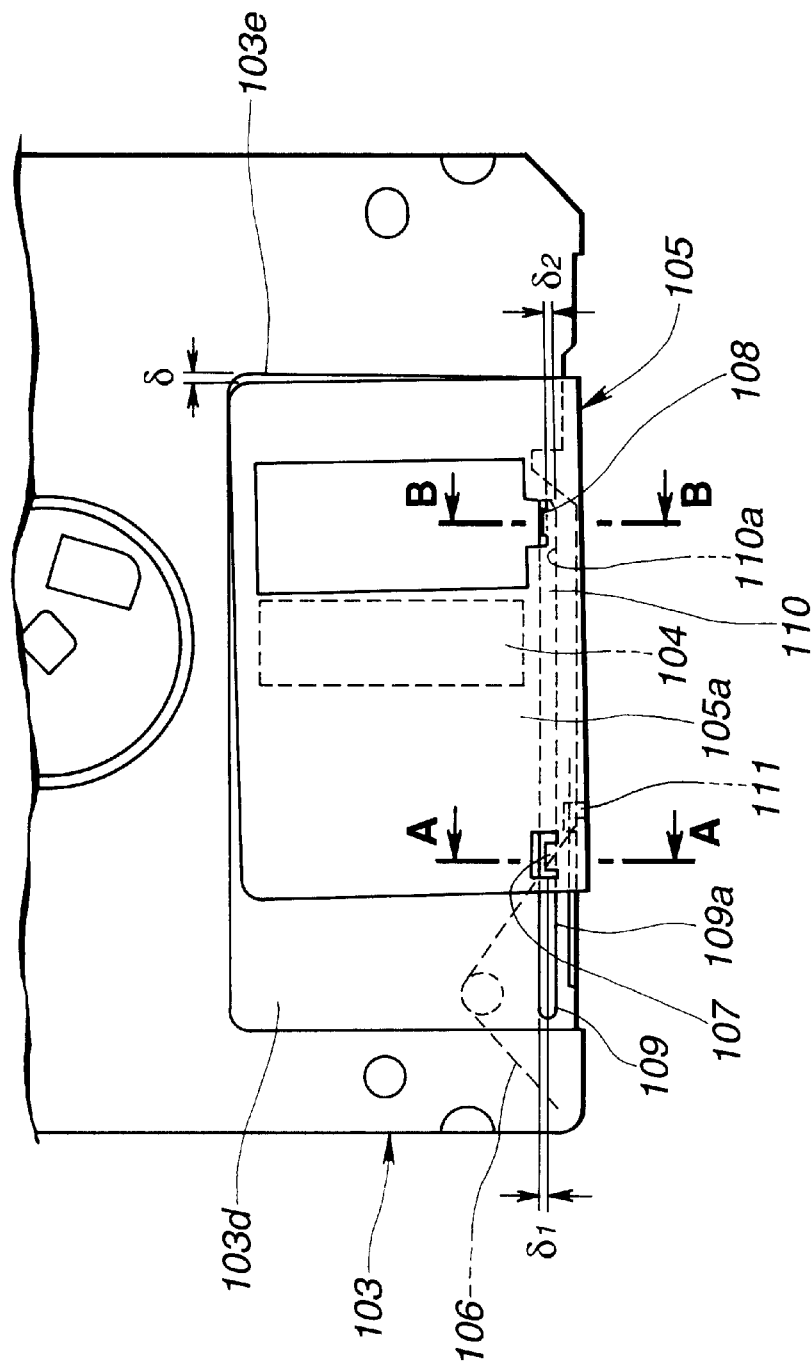
FIG. 12 is a plan view of an essential part of the previously proposed disc cartridge described in the BACKGROUND OF THE INVENTION.
Figure 13:
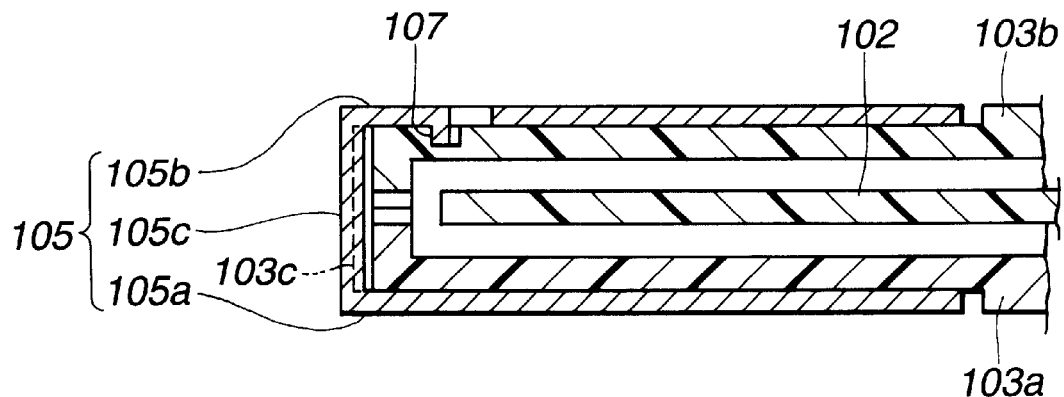
FIG. 13 is a cross sectional view of the previously proposed disc cartridge cut away along the line A—A in FIG. 10.
Figure 14:
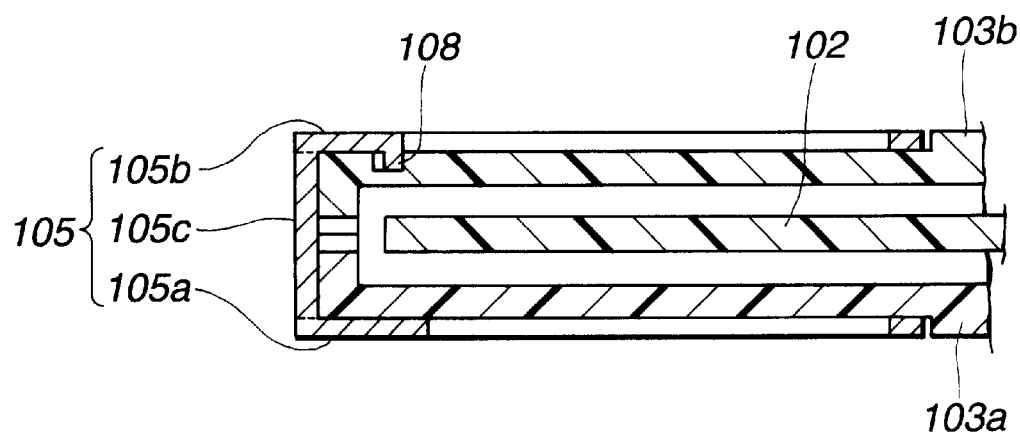
FIG. 14 is a cross sectional view of the previously proposed disc cartridge cut away along the line B—B in FIG. 12.

FIG. 8 shows a cross sectional view of the disc cartridge in the preferred embodiment cut away along a line B—B in FIG. 2.

The disc cartridge 1 includes: a disc-shaped recording medium 2; a shell 3 rotatably housing the disc-shaped recording medium 2; a shutter 5 to open and close openings 4 to play records provided on upper and lower surfaces of the shell 3; and a shutter biasing spring 6 to bias the shutter 5 in a direction toward which the openings 4 are closed.

The shutter 5 is slidably attached onto a recess (a shutter slide area) 7 for a shutter attaching purpose formed on upper and lower surfaces 3a and 3b of the shell 3 and across the front end surface of the shell 3. A depth D of the recess 7 used for the attachment of the shutter 5 is formed to have the approximately same value as a wall thickness T of the shutter 5.

As shown in FIG. 5, the disc-shaped recording medium 2 includes: a disc main body 21 made of a synthetic resin; and a center hub 22 made of a metallic magnetic material attached on a center portion of the disc main body 21.

The disc main body 21 is formed with magnetic recording layers provided on both surfaces of the circular synthetic resin films, each surface thereof having flexibility, and with a hub attaching hole 21a at the center of the disc main body 21.

The above-described center hub 22 includes: a ring shaped flange 22a; and an extending portion 22b in a cylindrical shape having a bottom extendedly formed from an inner peripheral side of a ring shaped flange 22 toward a downward direction.

An outer diameter of the flange portion 22a is formed to be larger than an inner diameter of the hub attaching hole 21a and both of the inner diameter of the flange portion 22a and the outer diameter of the extending portion 22b are smaller than an inner diameter of the hub attaching hole 21a.

The center hub 22 is attached onto the center of the disc main body 21 with a flange portion 22a overlapped on the upper surface of the disc main body 21 and adhered thereon with the extending portion 22b inserted into the hub attaching hole 21a from its upper surface of the disc main body 21.

The shell 3 is formed with side walls of the upper and lower halves 31 and 32 located in forward and rearward directions and in leftward and rightward directions overlapped together by means of weldings.

The upper half 31 is provided with a record playback opening 4 located substantially at the center of the front end surface of the shell 3 and its upper surface of the upper half 31 is provided with arc-shaped first, second, third, and fourth partitioning walls 33a, 33b, 33c, and 33d constituting a circular disc housing portion 34 rotatably housing the disc-shaped recording medium 2 together with arc-shaped first, second, third, and fourth partitioning walls 35a, 35b, 35c, and 35b of the lower half 32.

An outer side of the fourth partitioning wall 35b of the lower half 32 provides a housing portion 36 of the shutter housing spring 6.

As shown in FIGS. 3 and 4, a first slide guide groove 37 and a second slide guide groove 38 are formed so that the opening 4 is interposed between these grooves and in parallel to each other along the front end surface 3c in the proximity to the shell front end surface 3c within the recess (shutter slide area) 7 used for the attachment of the shell located at an outer side surface of the lower half 32, viz., the lower surface 3b of the shell 3.

It is noted that a distance $L_7$ ($=L_1$) from a side surface 37a to (a side surface opposed against the front end surface 3c of the shell 3) of the first slide guide groove 37 to the front end surface 3c of the shell 3 is set to be larger than a distance $L_8$ ($=L_2$) from a side surface 38a (a side surface opposed against the front end surface 3c of the shell 3) of the second slide guide groove 38 to the front end surface 3c of the shell 3 ($L_7 > L_8$).

In details, the first shutter slide guide 37 is formed at a position separate from the front end surface 3c of the shell 3 with a stepwise difference H with respect to a position of the second shutter slide guide groove 38. The inserting of the first and second slide guide projections 39 and 40 of the shutter 5 as will be described later into the first and second shutter slide guide grooves 37 and 38 permits the shutter 5 to be slid on the shell 3.

The shutter 5 includes: a first shutter plate portion 5a whose inner side is overlapped on an upper surface 3a of the shell 3; a second shutter plate portion 5b whose inner side is overlapped on a lower surface 3b of the shell 3; and a linkage plate portion 5c whose inner side is overlapped on the front end surface 3c of the shell 3. The shutter 5 is formed by bending the metallic plate in a letter U shape.

As shown in FIG. 3, a first slide guide projection 39 is partially cut out and bent and is projected from one end of a shutter slide direction of the second shutter plate portion 5b. The fist slide guide projection 39 is inserted into the first slide guide projection 40. A second slide guide projection 40 is partially cut out and bent and is projected from the other end of the second shutter plate portion 5b. In addition, a spring engagement portion 41 to be engaged to one end 6a of the shutter biasing spring 6 is partially cut out and bent and is projected from the linkage plate portion 5c in the proximity to the first slide guide projection 39.

As shown in FIG. 6, an inner surface center portion of the first and second slide guide projections 39 and 40 opposed against the linkage plate portion 5c are formed in arc-shaped surfaces so as to be projected toward the linkage plate portion 5c.

It is noted that a distance $L_3$ from a center portion of an inner surface of the first slide guide projection 39 to an outer surface of the linkage plate portion 5c and a distance $L_4$ from a center portion of an inner surface of the second slide guide projection 40 are substantially set to have mutually the same value ($L_3 \approx L_4$). In addition, the distance $L_3$ from the first slide guide projection 39 to the outer surface of the linkage plate portion 5c is set to have the same value as the distance $L_1$ from the front end surface 3c of the shell 3 to the side surface 37a of the first slide guide groove 37 ($L_3 \approx L_1$).

The shutter 5 is slidably attached onto the shell 3 by inserting the shell 3 between the first and second shutter plate portions 5a and 5b through the front end surface 3c of the shell 3 and, thereafter, by inserting the first and second slide guide projections 39 and 40 partially cut out and extended from the second shutter plate portion 5b into the slide guide grooves 37 and 38 provided on the shell 3.

In addition, the shutter 5 has one end 6a engaged to a spring engagement portion 41 partially cut out, bent, and extended from the linkage plate portion 5c and has the other end 6b pressed on a side portion of the shutter attaching recess 7 by means of the shutter biasing portion 6 engaged to an inner wall of the shell 3. Thus, the shutter 5 is arranged to close the record playback opening 4 formed on the upper and lower surfaces of the shell 3.

As described above, the above-described spring 6 exerts the spring force on the first and second shutter plate portions 5a and 5b to close the record playback opening 4 provided on the upper and lower surfaces 3a and 3b of the shell 3 in the direction toward which the opening 4 is closed and the resultant force is acted upon to project the linkage plate portion 5c from the front end surface 3c of the shell 3. However, as described above, the distance $L_7$ from the outer surface of the linkage plate portion 5c of the shutter 5 to the inner surface of the first slide guide projection 39 is set to be equal to the distance $L_7$ from the front end surface 3c of the shell 3 to a side surface 27a of the first slide guide groove 27. Consequently, the projection of the end portion of the linkage plate portion 5c of the shutter 5 located at the first slide guide projection 39 from the front end surface 3c of the shell 3 can almost completely be eliminated. However, it is not always necessary for the distance $L_1$ to be equal to the distance $L_3$.

A difference $L_5$ ($L_5=L_3-L_1$) in distance between the distance $L_3$ from the outer surface of the linkage plate portion 5c of the shutter 5 to the inner surface of the front slide guide projection 39 and the distance $L_1$ from the front end surface 3c of the shell 3 to one side surface 37a of the first slide guide groove 37 may be set to be smaller ($L_5<L_6$) than the difference in distance $L_6$ ($L_6=L_4-L_2$) between the distance $L_4$ from the outer surface of the linkage plate portion 5c of the shutter 5 to the inner surface of the second slide guide projection 40 and the distance $L_2$ from the front end surface 3c of the shell 3 to one side surface 38a of the second slide guide groove 38 so that the projection of the end portion of the linkage plate portion 5c of the shutter 5 located adjacent to the first slide guide projection 39 from the front end surface 3c of the shell 3 may be reduced.

In addition, in the embodiment, the first and second slide guide projections 39 and 40 are provided on the position on the same straight line in parallel to the outer surface of the linkage plate portion 5c of the shutter 5, the distance $L_3$ from the outer surface of the linkage plate portion 5c to the center position of the inner surface of the first slide guide projection 39 is set to have the same value as the distance $L_4$ from the outer surface of the linkage plate portion 5c of the shutter 5 to the inner surface of the second slide guide projection 40. In the embodiment, both of the first slide guide groove 37 and the second slide guide groove 38 have the stepwise differences H. In addition, in the embodiment, the distance $L_1$ from the front end surface 3c of the shell 3 to the side surface 37a of the first slide guide groove 37 has a difference from the distance $L_2$ from the front end surface 3c of the shell 3 to the side surface 38a of the second slide guide groove 38. On the contrary, as another preferred embodiment, the first and second slide guide grooves 37 and 38 may be disposed on the position on the same straight line in parallel to the front end surface 3c of the shell 3 and the first slide guide projection 3a and the second slide guide projection 40 may be formed with stepwise differences with respect to the outer surface of the linkage plate portion 5c of the shutter 5.

Alternatively, either the first or second slide guide groove 37 or 38 may mutually be linked as a single groove.

In the other embodiment described above, both of the first and second slide guide grooves 37 and 38 are formed in parallel to the first end surface 3c of the shell 3. However, both of the first and second slide guide grooves 37 and 38 may be tilted to the front end surface 30 of the shell 3 so that the distance $L_1$ from the front end surface 3c of the shell 3 to an end (an outside end 37b) of the first slide guide groove 37 through which the shutter is closed becomes shortest.

Furthermore, the distance $L_1$ from the front end surface 3c of the shell 3 to the end (the outside end 37b) of the first slide guide groove 37 may be shortest by partially forming a tilted surface or an arc-shaped projection on the end (outside end 37b) of the one side surface 37a of the first slide guide groove 37 through which the shutter closes the opening.

It is noted that the distance $L_1$ is defined as the distance between the front end surface 3c of the shell 3 and the side surface 37a of the first slide guide groove 37, the distance $L_2$ is defined as the distance between the front end surface of the shell 3 and the side surface 38a of the second slide guide groove 38, the distance $L_3$ is defined as the distance between the outer surface of the linkage plate portion 5c of the shutter 5 and the inner surface of the second slide guide projection 40, the distance $L_4$ is defined as the distance between the outer surface of the linkage plate portion 5c of the shutter 5 and the inner surface of the second slide guide projection 40, $L_5=L_3-L_1$, $L_6=L_4-L_2$, $L_5<L_6$, the distance $L_7$ is defined as the distance from the front end surface 3c of the shell to the side surface 37a of the first slide guide groove (=$L_1$), and the distance $L_8$ is defined as the distance from the front end surface 3c of the shell 3 to the side surface 38a of the second slide guide groove 38 (=$L_2$).

Although the present invention has been described above by reference to the embodiments of the invention, the invention is not limited to the embodiments described above will occur to those skilled in the art in light of the above teachings. The scope of the invention is defined with reference to the following claims.

What is claimed is:

1. A disc-cartridge comprising:

a disc-shaped recording medium;

a shell rotatably housing the disc-shaped recording medium;

a shutter, the shutter being slidably attached onto the shell and opening and closing a record playback opening provided on upper and lower surfaces of the shell;

first and second shutter plate portions; the first and second shutter plate portions constituting the shutter and being overlapped on the upper and lower surfaces of the shell, respectively;

a linkage plate portion, the linkage plate portion constituting the shutter, being linked to each one end of the first and second shutter portions, and having an inner surface overlapped on a front end surface of the shell;

first and second slide guide projections, the first and second slide guide projections being attached on one end and the other end of the second shutter plate portion in a shutter slide direction, the first and second slide guide projections formed with arc-shaped surfaces projecting toward the linkage plate portion;

first and second slide guide grooves formed in the shell and disposed along the front end surface of the shell, the first and second slide guide projections being respectively inserted into the first and second slide guide grooves to enable the shutter to slide therealong; and a spring, the spring biasing the shutter in a direction to close the record playback opening, having one end engaged to a side portion of the shutter onto which the first slide guide projection is installed, and having the other end being engaged to the shell, and wherein a first gap distance between the first slide guide projection and a side surface of the first slide guide groove nearest the linkage plate portion is smaller than a second gap distance between the second slide guide projection and a side surface of the second slide guide groove nearest the linkage plate portion.

2. A disc cartridge as claimed in claim 1, wherein a first distance from the first slide guide projections to the outer surface of the linkage plate portion of the shutter is set to be approximately equal to a second distance from the first slide guide groove into which the first slide guide projection is inserted to the front end surface of the shell.

3. A disc cartridge as claimed in claim 1, wherein the first and second slide guide projections are installed at positions on the same straight line extended in parallel to the outer surface of the linkage plate portion and each of the first and second slide guide grooves has a stepwise difference.

4. A disc cartridge as claimed in claim 1, wherein the first and second slide guide grooves are installed at positions on the same straight line extended in parallel to the front end surface of the shell and each of the first and second slide guide grooves has a stepwise difference.

* * * * *